US012129873B2

(12) United States Patent
Wechsel et al.

(10) Patent No.: US 12,129,873 B2
(45) Date of Patent: Oct. 29, 2024

(54) HYDRAULIC VALVE ASSEMBLY

(71) Applicant: HAWE Hydraulik SE, Aschheim (DE)

(72) Inventors: Thomas Wechsel, Aschheim (DE); Jean-Michel Sabatier, Aschheim (DE)

(73) Assignee: HAWE Hydraulik SE, Aschheim (DE)

( * ) Notice: Subject to any disclaimer, the term of this patent is extended or adjusted under 35 U.S.C. 154(b) by 0 days.

(21) Appl. No.: 18/358,473

(22) Filed: Jul. 25, 2023

(65) Prior Publication Data

US 2024/0035491 A1 Feb. 1, 2024

(30) Foreign Application Priority Data

Jul. 28, 2022 (DE) ..................... 10 2022 207 791.1

(51) Int. Cl.
*F15B 13/01* (2006.01)
*F15B 11/00* (2006.01)

(52) U.S. Cl.
CPC ........... *F15B 13/015* (2013.01); *F15B 11/003* (2013.01); *F15B 2211/30515* (2013.01); *F15B 2211/3058* (2013.01); *F15B 2211/30585* (2013.01); *F15B 2211/30595* (2013.01)

(58) Field of Classification Search
CPC .................... F15B 13/015; F15B 20/00; F15B 2211/3058; F15B 2211/30585; F15B 2211/30595; F15B 2211/7142
See application file for complete search history.

(56) References Cited

U.S. PATENT DOCUMENTS

| | | | | |
|---|---|---|---|---|
| 10,989,231 | B2 * | 4/2021 | Wechsel | F15B 13/0402 |
| 2015/0285274 | A1 * | 10/2015 | Kojima | E02F 9/2239 60/420 |
| 2019/0249692 | A1 * | 8/2019 | Wechsel | F15B 20/00 |
| 2020/0340499 | A1 * | 10/2020 | Stoenner | B66C 13/20 |
| 2021/0071688 | A1 * | 3/2021 | Son | E02F 9/2239 |
| 2021/0239141 | A1 * | 8/2021 | Jeon | F15B 13/06 |
| 2022/0128069 | A1 * | 4/2022 | Diebold | B66C 13/18 |

FOREIGN PATENT DOCUMENTS

| | | | | |
|---|---|---|---|---|
| DE | 3139635 A1 | | 4/1983 | |
| DE | 10 2018 202 148 B3 | | 3/2019 | |
| DE | 102019201182 A1 | * | 7/2020 | B60S 9/10 |
| JP | 05133323 A2 | | 5/1993 | |
| JP | 06336975 A2 | | 12/1994 | |

OTHER PUBLICATIONS

Examination Report for German Application No. 10 2022 207 791.1, dated Mar. 17, 2023, 11 pages.

* cited by examiner

*Primary Examiner* — Thomas E Lazo
(74) *Attorney, Agent, or Firm* — Dinsmore & Shohl LLP

(57) ABSTRACT

A hydraulic valve assembly includes a connection section, a first valve section and a pressure line. The first valve section has a first spool piston, a first spool diverter, at least one first consumer port and at least one second consumer port. The first spool diverter can be switched at least into a first spool diverter switching position and a second spool diverter switching position. A shut-off valve is disposed in the pressure line and blocks the pressure line in a blocking position and can be switched from the blocking position into a first release switching position and a second release switching position. The shut-off valve switches into the first release switching position when the first spool diverter is in the first spool diverter switching position and into the second release switching position when the first spool diverter is in the second spool diverter switching position.

19 Claims, 9 Drawing Sheets

HYDRAULIC VALVE ASSEMBLY

CROSS REFERENCE TO RELATED APPLICATION

This application claims priority to German Application 10 2022 207 791.1, filed Jul. 28, 2022, which is hereby incorporated by reference in its entirety.

FIELD OF THE INVENTION

The present invention relates to a hydraulic valve assembly. In particular, the present invention relates to a hydraulic valve assembly having a connection section, a first valve section and a pressure line. The first valve section is pressurizable by the connection section via the pressure line. Furthermore, the invention relates to a mobile hydraulic system with a hydraulic valve assembly according to the invention and to a commercial vehicle with such a mobile hydraulic system.

BACKGROUND OF THE INVENTION

Such hydraulic valve assemblies are known from the prior art, for example from DE 10 2018 202 148 B3. The valve assembly shown there has a connection section, a first valve section and a pressure line, wherein the first valve section can be pressurized by the connection section via the pressure line. The first valve section has a first spool piston, a first spool diverter, at least one first consumer port of the first valve section, and at least one second consumer port of the first valve section. A first group of hydraulic consumers can be controlled via the at least one first consumer port of the first valve section. A second group of hydraulic consumers can be controlled via the at least one second consumer port of the first valve section. The first spool diverter can be switched at least into a first spool diverter switching position and a second spool diverter switching position, so that the first group of hydraulic consumers can be controlled via the first spool piston when the first spool diverter is in the first spool diverter switching position, and so that the second group of hydraulic consumers can be controlled via the first spool piston when the first spool diverter is in the second spool diverter switching position.

In other words, a first group of hydraulic consumers is connected to the first consumer port and a second group of hydraulic consumers is connected to the second consumer port. Explained using the example of a mobile hydraulic system, for example a vehicle-mounted concrete pump, the hydraulic cylinders for controlling the mast or boom are combined in the first group, whereas the hydraulic cylinders for controlling the supports are combined in the second group.

Not least for safety reasons, it is imperative that faulty controls are avoided, i.e. that the supports are always controlled separately from the boom in the above example. In particular, the boom must only be controllable when the supports are fully extended and safe support of the vehicle-mounted concrete pump is ensured. Otherwise, a load of the mast could lead to instability and, in the worst case, to the vehicle-mounted concrete pump to flip over.

To interrupt the pressure supply in the event of such undesirable faulty controls of the spool diverter, DE 10 2018 202 148 B3 suggests that a shut-off valve be disposed in the pressure line. The shut-off valve blocks the pressure line in a blocking position so that the consumers connected to the consumer ports can no longer be supplied with pressure. For this purpose, a pilot pressure is only applied to the shut-off valve to switch it to an open position when the spool diverter is in the desired position and the correct and desired group of hydraulic consumers is controlled or actuated respectively.

The circuit shown in DE 10 2018 202 148 B3 can be used to forcibly interrupt the pressure supply if the spool diverter is incorrectly controlled. However, the solution according to DE 10 2018 202 148 B3 does not allow a distinction to be made as to whether the first group of hydraulic consumers or the second group of hydraulic consumers are intended to be controlled.

SUMMARY OF THE INVENTION

It is therefore the objective of the present invention to provide a simple solution for determining which group of hydraulic consumers is controlled.

The solution to the problem is achieved with a hydraulic valve assembly according to embodiments disclosed herein.

The hydraulic valve assembly according to the invention is distinguished from the hydraulic valve assemblies known in the prior art in particular in that the shut-off valve can be switched from the blocking position into a first release switching position and a second release switching position, the pressure line being released in the first release switching position and in the second release switching position. According to the invention, the shut-off valve switches into the first release switching position when the first spool diverter is in the first spool diverter switching position and into the second release switching position when the first spool diverter is in the second spool diverter switching position.

Thus, the switching position of the shut-off valve can be used to distinguish whether the first group of hydraulic consumers or the second group of hydraulic consumers is to be controlled. The shut-off valve is thus a directional valve with three switching positions, whereby the first release switching position and the second release switching position can be determined in a simple manner, for example, via a limit switch or a proportionally measuring displacement transducer. This results in a very simple way of determining which of the groups of hydraulic consumers is or is to be controlled.

The shut-off valve may have a binary behavior i.e., it moves from one switching position to another without adopting intermediate positions. Hence, the switching positions of the shut-off valve are thus clearly distinguishable from each other.

Preferably, the shut-off valve is biased into the blocking position. Hence, the pressure line is normally interrupted and is only released when the first spool diverter is in the desired switching position for controlling the desired group of hydraulic consumers.

Preferably, the first valve section comprises a first reset device, wherein the first reset device biases the first spool diverter into the second spool diverter switching position. In this way, it can be ensured that in the normal case, i.e. when the first spool diverter is not switched, the second group of hydraulic consumers is controlled. However, it is of course also conceivable that the first reset device biases the first spool diverter into the first spool diverter switching position.

Preferably, the shut-off valve is disposed between the connection section and the first spool in the pressure line. In particular, it is preferably if the hydraulic assembly comprises an intermediate section disposed between the connection section and the first valve section, with the shut-off valve being disposed in the intermediate section. This enables a modular design of the hydraulic valve assembly.

Preferably, the connection section comprises a supply regulator. The supply regulator may be a pressure compensator.

The hydraulic valve assembly preferably comprises at least one second valve section that can be pressurized by the connection section via the pressure line, the second valve section comprising a second spool, a second spool diverter, at least one first consumer port of the second valve section and at least one second consumer port of the second valve section. The pressure line preferably extends through the first valve section to the second valve section. The first group of hydraulic consumers is controllable via the at least one first consumer port of the second valve section, wherein the second group of hydraulic consumers is controllable via the at least one second consumer port of the second valve section. The second spool diverter is switchable into a first spool diverter switching position and a second spool diverter switching position, such that the first group of hydraulic consumers is controllable via the second spool diverter piston when the second spool diverter is in the first spool diverter switching position, and such that the second group of hydraulic consumers is controllable via the second spool diverter piston when the second spool diverter is in the second spool diverter switching position. Preferably, the first spool diverter and the second spool diverter switch together and in parallel into the respective first spool diverter switching position or into the respective second spool diverter switching position.

Thus, several hydraulic consumers within a group of hydraulic consumers can be controlled separately from each other. The common and parallel switching of the first spool diverter and the second spool diverter ensures that always the desired group of hydraulic consumers is controlled or can be controlled. In this context, it is also conceivable that the hydraulic valve assembly also has three or more valve sections.

The second valve section preferably has a second reset device, the second reset device biasing the second spool diverter into the second spool diverter switching position. Of course, it is also conceivable that the second reset device biases the second spool diverter into the first spool diverter switching position. It is important here that the first reset device biases the first spool diverter and the second reset device biases the second spool diverter into the same spool diverter switching position in each case, i.e. either both spool diverters are biased into the first spool diverter switching position or both spool diverters are biased into the second spool diverter switching position.

Preferably, the first valve section comprises at least one third consumer port, it being possible to control a third group of hydraulic consumers via the at least one third consumer port of the first valve section, wherein the first spool diverter can be switched into a third spool diverter switching position, so that the third group of hydraulic consumers can be controlled via the first spool piston when the first spool diverter is in the third spool diverter switching position. Further, it is preferably if the second valve section likewise comprises at least one third consumer port, wherein the third group of hydraulic consumers can be controlled via the at least one third consumer port of the second valve section, wherein the second spool diverter can be switched into a third spool diverter switching position, so that the third group of hydraulic consumers can be controlled via the second spool piston when the second spool diverter is in the third spool diverter switching position, the first spool diverter being switchable together and in parallel with the second spool diverter into the respective third spool diverter switching position. Thus, a third group of hydraulic consumers can be controlled via the first valve section and the second valve section. It is therefore possible, for example, to control the left and right supports of a commercial vehicle separately as a separate group. Due to the common and parallel switching of the first spool diverter and the second spool diverter, faulty control is largely ruled out.

Preferably, the shut-off valve switches to the first release switching position when the first spool diverter and the second spool diverter are in the third spool diverter switching position. Thus, the first spool diverter switching position and the third spool diverter switching position of the first spool diverter and the second spool diverter are grouped together because the shut-off valve switches to the first release switching position in both spool diverter switching positions. It therefore makes sense to select the first group of hydraulic consumers and the third group of hydraulic consumers analogously, for example the left supports and the right supports of a commercial vehicle with a mobile hydraulic system.

Preferably, the hydraulic valve assembly comprises a hydraulic pilot control device, the hydraulic pilot control device being configured to apply pilot pressure to the first spool diverter and/or the second spool diverter for common and parallel switching in into the respective first spool diverter switching position and/or the respective third spool diverter switching position, and pilot control pressure is applied to the shut-off valve via the hydraulic pilot control device for switching from the blocking position into the first release switching position or into the second release switching position. Thus, the pilot pressure applied for switching the spool diverters is also used for switching the shut-off valve. An independent pilot pressure circuit or other type of actuation for the shut-off valve is therefore not required.

It is further preferable if the hydraulic pilot control device has at least one first shut-off valve pilot line for switching the shut-off valve from the blocking position to the first release switching position, wherein a pilot pressure is only applied to the at least one first shut-off valve pilot line when the first spool diverter and the second spool diverter are each in the first spool diverter switching position or when the first spool diverter and the second spool diverter are each in the third spool diverter switching position. This ensures that the pressure line is only released via the shut-off valve when the first and second spool diverter are in the same and desired switching position. In this way, faulty control can be ruled out, since the shut-off valve is not switched from the blocking position to the first release switching position in the event of faulty control of one of the two spool diverters.

Preferably, the hydraulic pilot control device comprises a pilot valve device, a pilot line, a return line, a first pilot branch and a second pilot branch, wherein a pilot pressure in the first pilot branch switches the first spool diverter and the second spool diverter together in into the respective first spool diverter switching position, and wherein a pilot pressure in the second pilot branch switches the first spool diverter and the second spool diverter together into the respective third spool diverter switching position, and wherein the pilot valve device in a first switching position applies pilot pressure to the first pilot branch and connects the second pilot branch to the return line, and wherein the pilot valve device in a second switching position applies pilot pressure to the second pilot branch and connects the first pilot branch to the return line. Based on the switching position of the pilot valve device, either the first pilot branch or the second pilot branch can thus be pressurized with pilot pressure, whereby the pilot branch not pressurized with pilot pressure is relieved via the return line to the tank. This results in a particularly simple design of the hydraulic pilot control device.

Preferably, the at least one first shut-off valve pilot line can be pressurized with pilot pressure via the first pilot branch and/or via the second pilot branch. It is conceivable that a selector valve is provided in such a way that the respective pilot branch to which pilot pressure is applied is connected to the first shut-off valve pilot line.

Preferably, the at least one first shut-off valve pilot line can be relieved to the tank via a first relief line, the first relief line preferably opening into the return line of the hydraulic pilot control device. Thus, a possible (pilot) pressure in the first shut-off valve pilot line can be safely relieved so that the shut-off valve switches safely from the first release switching position to the blocking position. In this context, it is particularly preferable if a first hydraulic resistor is disposed in the first relief line, the first hydraulic resistor preferably being a nozzle. Consequently, relief of the first shut-off valve pilot line via the first hydraulic resistor inevitably results, so that no residual pressure can remain in the second shut-off valve pilot line. It is therefore ensured that the shut-off valve switches reliably into the blocking position.

The hydraulic valve assembly preferably comprises a second shut-off valve pilot line for switching the shut-off valve from the blocking position to the second release switching position, wherein pilot pressure is applied to the second shut-off valve pilot line in a third switching position of the pilot valve device. Preferably, the second shut-off valve pilot line can be relieved to the tank via a second relief line, wherein the second relief line preferably opens into the return line of the hydraulic pilot control device. Thus, a possible (pilot) pressure in the second shut-off valve pilot line can be safely relieved so that the shut-off valve switches safely from the second release switching position to the blocking position. Preferably, a second hydraulic resistor is disposed in the second relief line, the second hydraulic resistor preferably being a nozzle. Consequently, relief of the second shut-off valve pilot line via the second hydraulic resistor is inevitable, so that no residual pressure can remain in the second shut-off valve pilot line. It is therefore ensured that the shut-off valve switches reliably into the blocking position.

It is also conceivable in this context that the shut-off valve is a proportional shut-off valve. This means that different pilot pressures can be applied to the shut-off valve via the first shut-off valve pilot line for switching from the blocking position to the first release switching position, depending on whether the first spool diverter is in the first spool diverter switching position or in the third spool diverter switching position. This results in different strokes of the shut-off valve in the first release switching position depending on the spool diverter switching position. Preferably, therefore, the shut-off valve has a proportionally measuring displacement transducer so that the stroke determined via the displacement transducer can be used to derive which spool diverter switching position the first spool diverter is in. This results in a simply designed proportional shut-off valve with which it is also possible to differentiate within the first release switching position whether the first group or the third group of hydraulic consumers is controlled.

Furthermore, the solution of the problem is achieved with a mobile hydraulic system according to claim 16 and a commercial vehicle with such a mobile hydraulic system according to claim 17. The mobile hydraulic system according to the invention comprises a hydraulic valve assembly as described above. Further, the mobile hydraulic system preferably comprises at least the first group of hydraulic consumers and the second group of hydraulic consumers. In particular, the first group of hydraulic consumers is connected to the at least one first consumer port of the first valve section and to the at least one first consumer port of the second valve section, and the second group of hydraulic consumers is connected in particular to the at least one second consumer port of the first valve section and to the at least one second consumer port of the second valve section. Preferably, the mobile hydraulic system also comprises the third group of hydraulic consumers. Preferably, the third group of hydraulic consumers is connected to the at least one third consumer port of the first valve section and to the at least one third consumer port of the second valve section.

Although only two valve sections have been described above, the hydraulic valve assembly according to the invention may also have three or more valve sections.

DETAILED DESCRIPTION OF THE DRAWINGS

Figure 1:
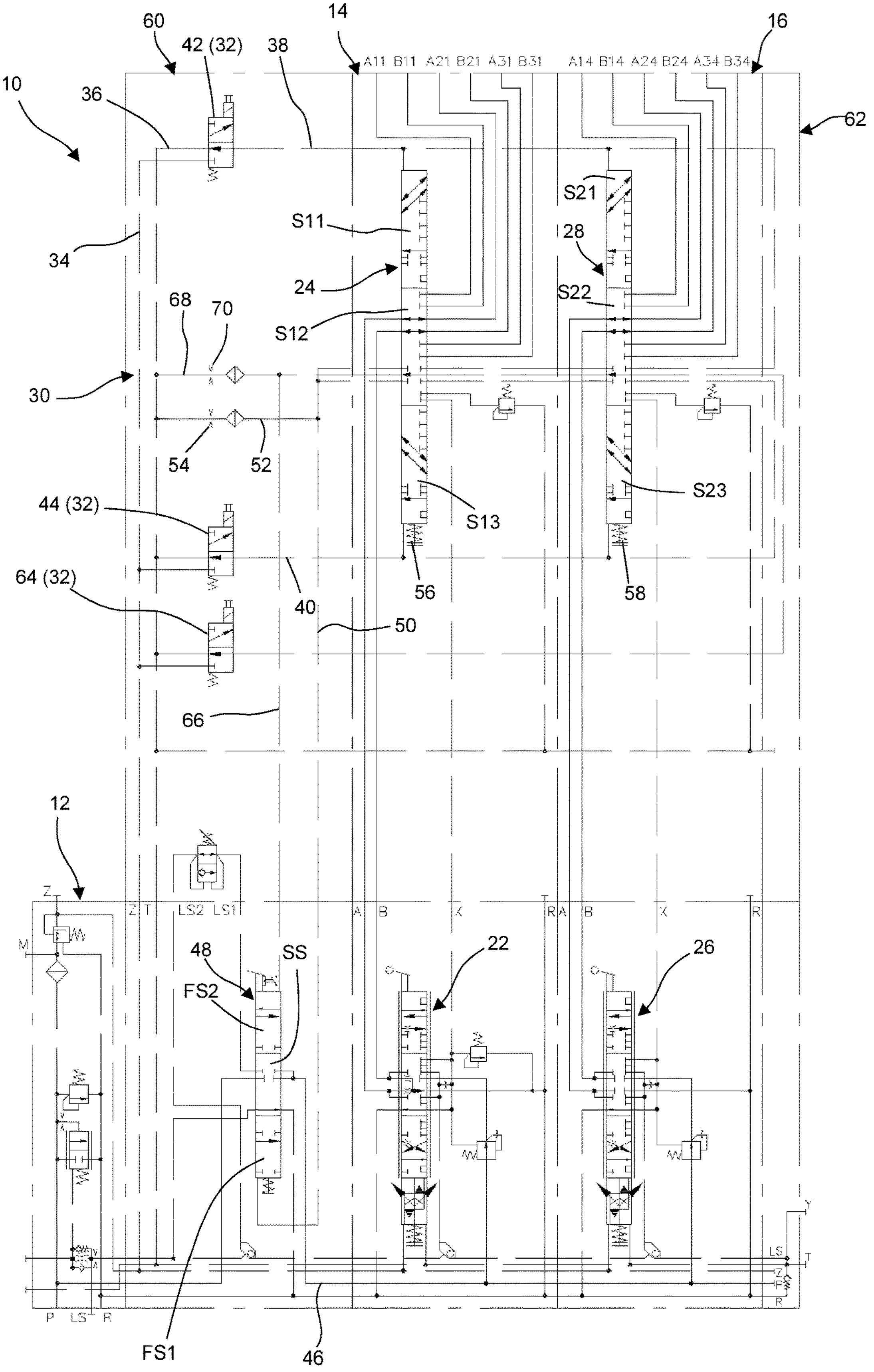
FIG. 1 is a hydraulic circuit diagram of a hydraulic valve assembly according to the invention in accordance with a first embodiment.

FIG. 1 depicts a hydraulic circuit diagram of a hydraulic valve assembly 10 according to the invention according to a first embodiment. The hydraulic valve assembly 10 comprises a connection section 12, an intermediate section 60, an end plate 62, and a first valve section 14 and a second valve section 16. The first valve section 14 and the second valve section 16 can be pressurized via the connection section 12 by a pressure line 46, as will be described in more detail below. For this purpose, a pressure source is connected to the port P of the connection section 12 in a known manner so that the pressure can be appropriately distributed via the pressure line 46. Therefore, the connection section 12 comprises a supply regulator. The supply regulator may be pressure compensator. As shown, the intermediate section 60 is disposed between the connection section 12 and the first valve section 14.

The first valve section 14 has a first proportional spool piston 22 and a first spool diverter 24. As also shown in particular in FIG. 3, the first spool diverter 24 is configured as an 8/3-spool diverter. In addition, the first valve section 14 comprises a total of six consumer ports A11, B11, A21, B21, A31 and B31 for connecting hydraulic consumers, which can be pressurized or relieved to the tank in a known manner via proportional displacement of the first spool piston 22. The first spool diverter 24 can be switched to a total of three switching positions S11, S12 and S13, namely to a first switching position S11, a second switching position S12 and a third switching position S13. A first reset device 56 maintains the first spool diverter 24 in the second switching position S12 as a neutral position. When the first spool diverter 24 is in the first switching position S11, the consumer ports A11 and B11 can be pressurized, and the consumer ports A21, B21, A31, and B31 are blocked. The consumer ports A11 and B11 thus denote first consumer ports of the first valve section 14 in the sense of the present invention. In the second switching position S12 of the first spool diverter 24, the consumer ports A21 and B21 can be pressurized, with the consumer ports A11, B11, A31 and B31 being blocked. The consumer ports A21 and B21 thus denote second consumer ports of the first valve section 14 in the sense of the present invention. In the third switching position S13 of the first spool diverter 24, the consumer ports A31 and B31 can be pressurized, with the consumer ports A11, B11, A21 and B21 being blocked. Consequently, the consumer ports A31 and B31 denote third consumer ports of the first valve section 14 in the sense of the present invention.

Figure 3:
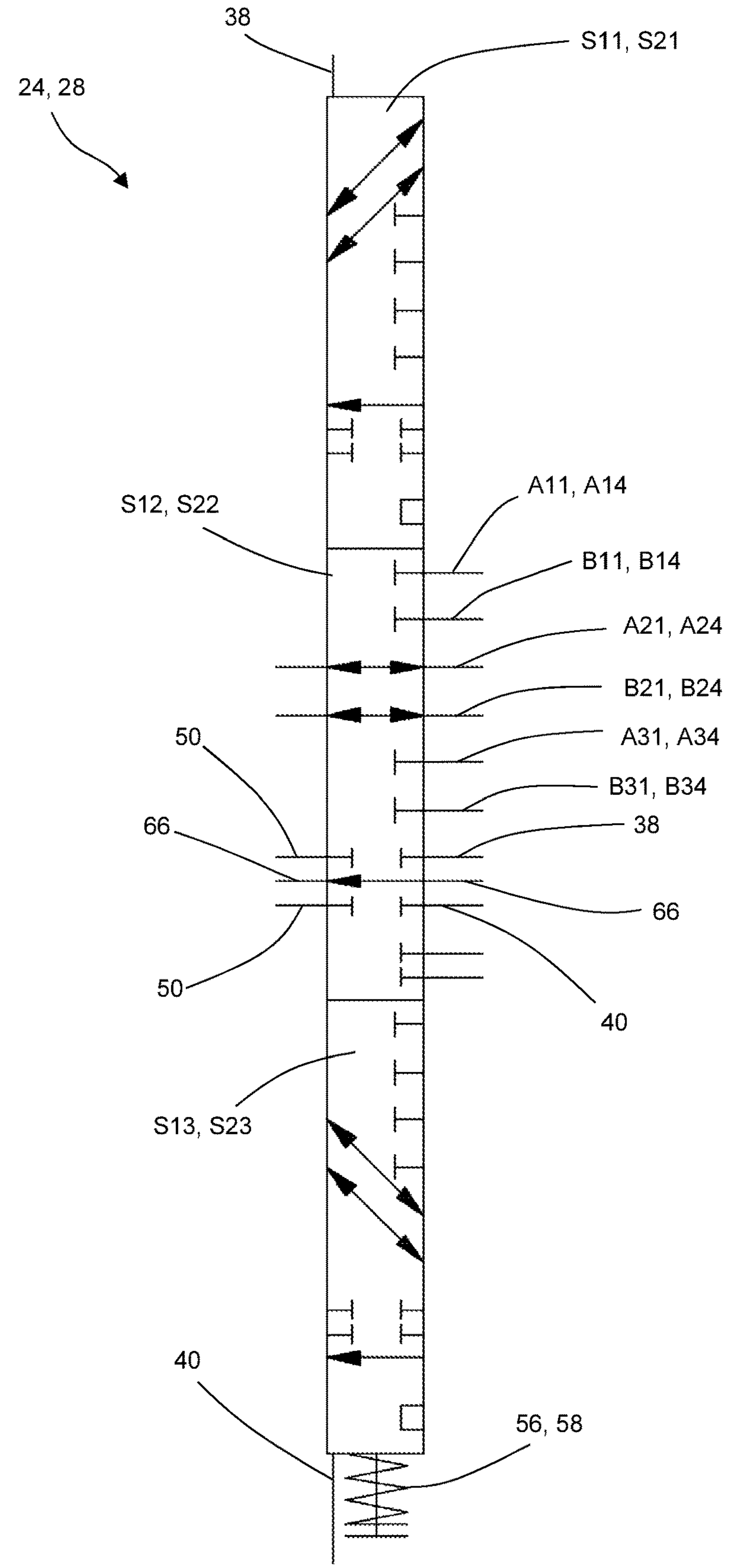
FIG. 3 is a detailed view of an 8/3-spool diverter shown in FIG. 1.

The second valve section 16 is constructed in the same way as the first valve section 14 and has a second proportional spool piston 26 as well as a second spool diverter 28, which is also configured as an 8/3-spool diverter, cf. FIG. 3. The second valve section 16 also has a total of six consumer ports A14, B14, A24, B24, A34 and B34 for connecting hydraulic consumers, which can be pressurized or relieved towards the tank in a known manner via a proportional displacement of the second spool piston 26. In addition, the second spool diverter 28 can also be switched into a total of three switching positions S21, S22 and S23, namely into a first switching position S21, a second switching position S22 and a third switching position S23. The second spool diverter 28 is maintained in the second switching position S22 as a neutral position via a second reset device 58. When the second spool diverter 28 is in the first switching position S21, the consumer ports A14 and B14 can be pressurized, and the other consumer ports A24, B24, A34 and B34 are blocked. Thus, the consumer ports A14 and B14 denote first consumer ports of the second valve section 16 in the sense of the present invention. When the second spool diverter 28 is in the second switching position S22, pressure can be applied to the consumer ports A24 and B24. In the second switching position S22, the further consumer ports A14, B14, A34 and B34 are blocked. Thus, in terms of the present invention, the consumer ports A24 and B24 denote second consumer ports of the second valve section 16. When the second spool diverter 28 is in the third switching position S23, the consumer ports A34 and B34 can be pressurized, with the other consumer ports A14, B14, A24 and B24 being blocked. Consequently, the consumer ports A34 and B34 denote third consumer ports of the second valve section 16 in the sense of the present invention.

In order to switch the first spool diverter 24 and the second spool diverter 28 together and in parallel, a hydraulic pilot control device 30 is disposed in the intermediate section 60. The hydraulic pilot control device 30 has a pilot line 34 and a return line 36. The pilot pressure to be applied is tapped directly downstream of the connection section 12 via the pilot line 34. The hydraulic pilot control device 30 further comprises a pilot valve device 32, via which pilot pressure can be applied to the first spool diverter 24 and the second spool diverter 28 in parallel in order to switch the first spool diverter 24 and the second spool diverter 28 together from the respective second switching position S12, S22 into the respective first switching position S11, S21 or into the respective third switching position S13, S23. For this purpose, the pilot valve device 32 can be switched to a first switching position, a second switching position or a third switching position. In the first switching position of the pilot valve device 32, a first pilot branch 38 of the hydraulic pilot device 30 is connected to the pilot line 34, and in the second switching position of the pilot valve device 32, a second pilot branch 40 of the hydraulic pilot device 30 is connected to the pilot line 34. Accordingly, the first pilot branch 38 is connected to the return line 36 in the second switching position of the pilot valve device 32 and the second pilot branch 40 is connected to the return line 36 in the first switching position of the pilot valve device 32.

To realize these switching positions, the pilot valve device 32 in this embodiment has a first pilot valve 42 and a second pilot valve 44, which connect the first pilot branch 38 and the second pilot branch 40 selectively either to the pilot line 34 or to the return line 36. The first pilot valve 42 and the second pilot valve 44 are each designed as solenoid-operated 3/2-directional valves. The first pilot valve 42 and the second pilot valve 44 are each biased via a corresponding biasing device in such a way that the first pilot branch 38 and the second pilot branch 40 are connected to the return line 36 in the de-energized state of the first pilot valve 42 and the second pilot valve 42 and are thus relieved. To switch the pilot valve device 32 to the first switching position, the first pilot valve 42 is energized so that the pilot line 34 is connected to the first pilot branch 38. The second pilot valve 44 remains de-energized. Accordingly, the second pilot valve 44 is energized to switch the pilot valve device 32 to the second switching position. The first pilot valve 42 is de-energized in the second switching position of the pilot valve device 32.

Furthermore, the hydraulic valve assembly 10 comprises a shut-off valve 48, which in this embodiment is part of the intermediate section 60. The shut-off valve 48 is disposed in the pressure line 46 between the connection section 12 and the first spool piston 22, and is biased by a corresponding spring device into a blocking position SS such that the pressure line 46 is blocked. In other words, unless the shut-off valve 48 is switched, the first valve section 14 and the second valve section 16 cannot be supplied with pressure. In this embodiment, the shut-off valve 48 is configured as a pilot-controlled 6/3-directional valve.

In order to switch the shut-off valve 48 to a first release switching position FS1 and to thus release the pressure line 46, the hydraulic pilot control device 30 comprises a first shut-off valve pilot line 50. As shown, the first shut-off valve pilot line 50 is pressurized via the first pilot branch 38 or the second pilot branch 40. For this purpose, the first pilot branch 38 is redirected in the end plate 62 and connected to the first shut-off valve pilot line 50 via the first spool diverter 24 and the second spool diverter 28, provided that the first spool diverter 24 and the second spool diverter 28 are in the first switching position S11, S21, respectively. If one of the two spool diverter valves 24, 28 is not in the first switching position S11, S21, the connection between the first pilot branch 38 and the shut-off valve pilot line 50 is blocked. Accordingly, the second pilot branch 40 is also redirected in the end plate 62 and connected to the first shut-off valve pilot line 50 via the first spool diverter 24 and the second spool diverter 28, provided that the first spool diverter 24 and the second spool diverter 28 are each in the third switching position S13, S23. When either of the spool diverter 24, 28 is not in the third switching position S13, S23, the connection between the second pilot branch 40 and the shut-off valve pilot line 50 is blocked. Thus, the pressure line 46 is released via the shut-off valve 48 only when the first spool diverter 24 and the second spool diverter 28 are in the actually desired switching position.

For example, if the pilot valve device 32 is switched to the first switching position to switch the first spool diverter 24 to the first switching position S11 and the second spool diverter 28 is also switched to the first switching position S21, the shut-off valve 48 is only switched when both spool diverters 24, 28 also switch to the first switching position S11, S21. If one of the two spool diverter valves 24, 28 does not switch properly, the first pilot branch 38 is not connected to the first shut-off valve pilot line 50. The shut-off valve 48 remains in the biased blocking position SS blocking the pressure line 46. Consequently, the first valve section 14 and the second valve section 16 can only be supplied with pressure via the pressure line 46 if the spool diverters 24, 28 are correctly switched.

In order to also enable pressurization or depressurization of the corresponding second hydraulic connections A21, B21, A24 and B24 of the first valve section 14 under second valve section 16 in the second switching position S12 of the first spool diverter 24 and the second switching position S22 of the second spool diverter 28, the hydraulic valve assembly 10 has a second shut-off valve pilot line 66, via which the shut-off valve 48 can also be pressurized with pilot pressure in order to be switched into a second release switching position FS2 releasing the pressure line 46. For this purpose, the pilot valve device 32 is switched to the third switching position. The second shut-off valve pilot line 66 is connected to the pilot line 34 or the return line 36 via a third pilot valve 64 of the pilot valve device 32. In this exemplary embodiment, the third pilot valve 64 is configured as a solenoid-operated 3/2-directional valve and is biased via a corresponding biasing device in such a way that the second shut-off valve pilot line 66 is connected to the return line 36 in the de-energized state of the third pilot valve 64. If only the third pilot valve 64 is energized and consequently the pilot valve device 32 is switched to the third switching position, the pilot line 34 is connected to the second shut-off valve pilot line 66. As shown in FIG. 1, the second shut-off valve pilot line 66 is redirected in the end plate 62 and routed to the shut-off valve 48 via the first spool diverter 24 and the second spool diverter 28. When at least one of the two spool diverter valves 24, 28 is not in the second switching position S12, S22, the second shut-off valve pilot line 66 is blocked and the pilot pressure cannot be signaled to the shut-off valve 48. Consequently, the shut-off valve 48 is not switched to the second release switching position FS2, so that the pressure line 46 remains blocked. A pressure supply to the first valve section 14 and the second valve section 16 is therefore interrupted.

To ensure that the shut-off valve 48 is not rendered unswitchable due to a pressure trapped in the first shut-off valve pilot line 50, the first shut-off valve pilot line 50 is relieved to the tank T or return line R via a first relief line 52. As shown in FIG. 1, the first shut-off valve pilot line 50 is connected to the return line 36 of the hydraulic pilot device 30 via the first relief line 52. In this embodiment, the first relief line 52 branches off of the first shut-off valve pilot line 50 between the first spool diverter 24 and the shut-off valve 48. To ensure that sufficient pressure is present in the first shut-off valve pilot line 50 to safely switch the shut-off valve 48, a first hydraulic resistor 54 is disposed in the first relief line 52. In this embodiment, the first hydraulic resistor 54 is configured as a nozzle. Accordingly, the second shut-off valve pilot line 66 is also relieved to the tank T or return line R via a second relief line 68. The second relief line 68 branches off from the second shut-off valve pilot line 66 between the first spool diverter 24 and the shut-off valve 48 and opens into the return line 36. To ensure that a sufficient pressure for switching the shut-off valve 48 into the second release switching position FS2 is present in the second shut-off valve pilot line 66, a second hydraulic resistor 70 is disposed in the second relief line 68. The second hydraulic resistor 70 is also configured here as a nozzle. Via the first hydraulic resistor 54 and the second hydraulic resistor 70, a possibly trapped residual pressure in the first shut-off valve pilot line 50 or the second shut-off valve pilot line 66 is slowly relieved, so that the shut-off valve 48 switches reliably from the first release switching position FS1 or the second release switching position FS2 to the blocking position SS blocking the pressure line 46. The shut-off valve 48 and the corresponding signal of the pilot pressure can thus reliably exclude a faulty control.

Figure 2:
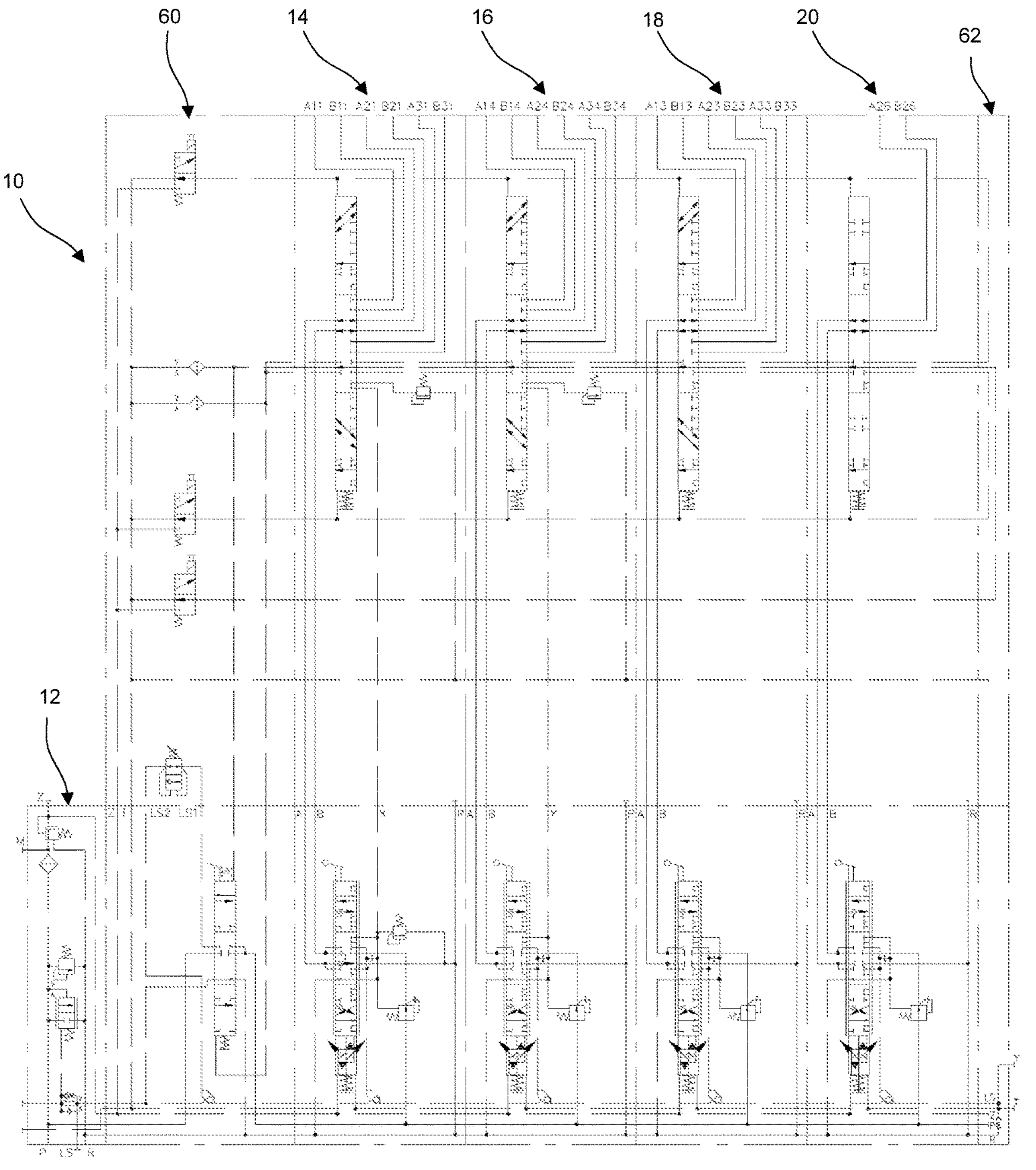
FIG. 2 is a variant of the hydraulic valve assembly shown in FIG. 1.

FIG. 2 shows a variant of the hydraulic valve assembly 10 shown in FIG. 1 as a hydraulic circuit diagram. The variant shown in FIG. 2 differs from the first embodiment shown in FIG. 1 in that a third valve section 18 and a fourth valve section 20 are also provided between the second valve section 16 and the end plate 62, via which the consumer ports A13, B13, A23, B23, A33, B33 and A26, B26 can be pressurized. The third valve section 18 and the fourth valve section 20 are basically constructed in the same way as the first valve section 14 and the second valve section 16. Consequently, the spool diverters of the third valve section 18 and the fourth valve section 20 are also switched together with the first spool diverter 24 and the second spool valve 28 from the second switching position into the first switching position or into the third switching position via the hydraulic pilot control device 30. Accordingly, pilot pressure is applied to the shut-off valve 48 via the first shut-off valve pilot line 50 or the second shut-off valve pilot line 66 and it is switched from the blocking position blocking the pressure line 46 into the first release switching position or into the second release switching position only when all the spool diverters of the first to fourth valve sections 14, 16, 18 and 20 are in the same switching position.

As shown in FIG. 2, it is not absolutely necessary for all spool diverters to be of identical design. In the variant shown in FIG. 2, the spool diverter of the fourth valve section 20 is configured in such a way that the only two consumer ports A26 and B26 of the fourth valve section 20 can be pressurized when the spool diverter of the fourth valve section 20 is in the second switching position. In this context, it should be noted that, in the sense of the invention, all combinations of valve sections are generally possible. For example, a variant is also conceivable in which a valve section has only two consumer ports which can be pressurized in the first switching position or in the third switching position of the spool diverter.

Figure 4:
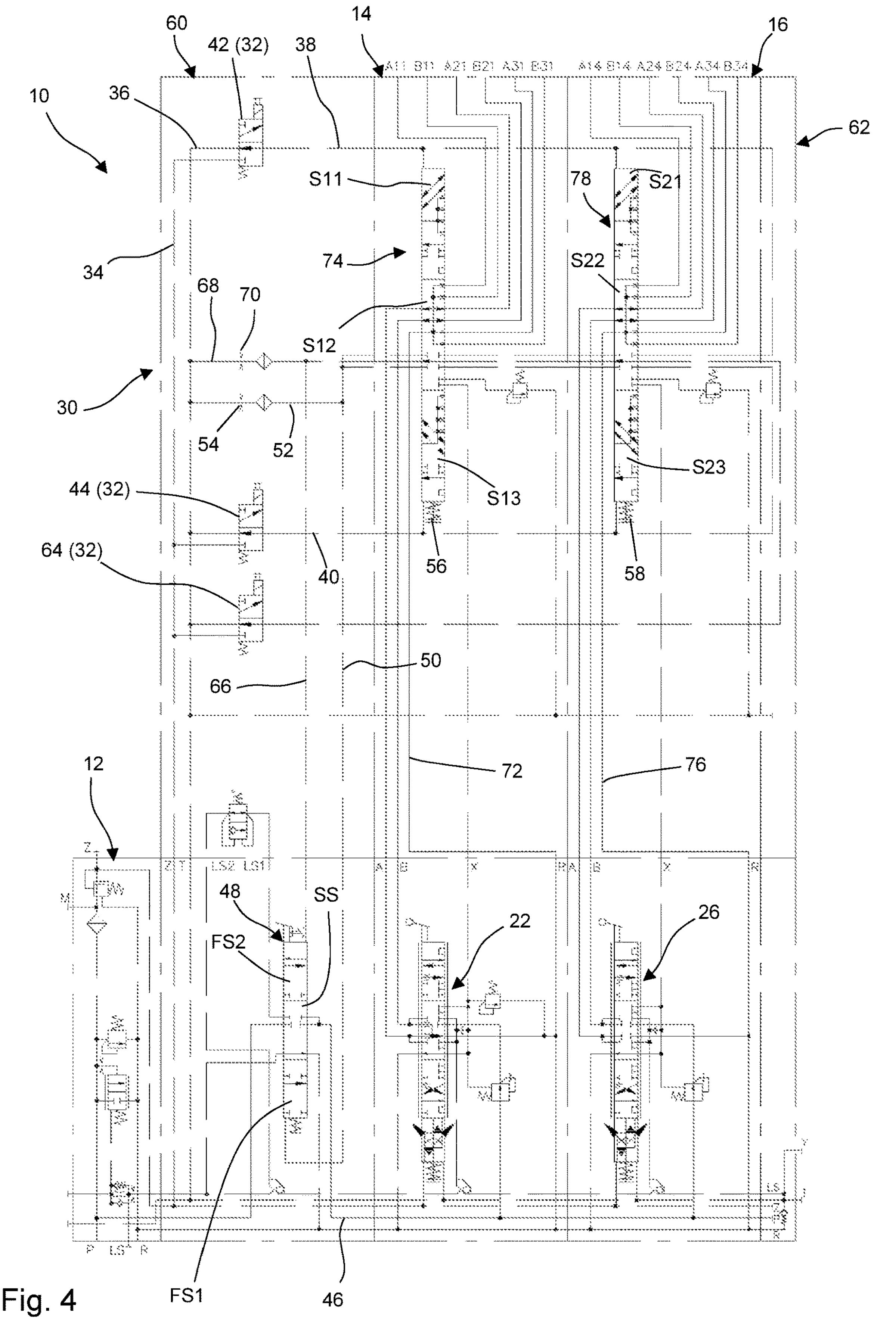
FIG. 4 is a hydraulic circuit diagram of a hydraulic valve assembly according to the invention in accordance with a second embodiment.

FIG. 4 shows a hydraulic circuit diagram of a hydraulic valve assembly 10 according to the invention in accordance with a second embodiment. The hydraulic valve assembly 10 according to the second embodiment differs from the hydraulic valve assembly according to the first embodiment shown in FIGS. 1 to 3 in that the consumer ports which are not pressurized are not blocked, but are relieved via the first spool diverter 74 of the first valve section 14 and the second spool diverter 78 of the second valve section 16 to the return line R. In the following, for reasons of clarity, only the differences between the hydraulic valve assembly 10 according to the first embodiment and the hydraulic valve assembly 10 according to the second embodiment will be described.

In other words, when the first spool diverter 74 and the second spool diverter 78 are in the second switching position S12, S22, the second consumer ports A21, B21 of the first valve section 14 and the second consumer ports A24, B24 of the second valve section 16 can be pressurized or relieved to the return line R, respectively. The first and third consumer ports A11, B11, A31 and B31 of the first valve section 14 and the first and third consumer ports A14, B14, A34 and B34 of the second valve section 16 are not blocked, but are relieved to the return line R via the first spool diverter 74 and the second spool diverter 78, respectively.

For this purpose, the first valve section 12 comprises a first main return line 72, via which the consumer ports that cannot be pressurized via the first spool piston 22 are collectively relieved toward the return line R. As shown in particular in FIG. 5, the first spool diverter 74 has a first collecting channel 80 for this purpose for each of the three switching positions S11, S12 and S13, which connects the consumer ports not connected to the first spool piston 22 to the first main return line 72. The first collecting channel 80 is configured in such a way that the consumer ports connected to it are throttled by a first throttle 82 and relieved via the first main return line 72.

Accordingly, the second valve section 16 comprises a second main return line 76, via which the consumer ports that cannot be pressurized via the second spool piston 26 are collectively relieved towards the return line R. For this purpose, the second spool diverter 78 has a second collecting channel 84 for each of the three switching positions S21, S22 and S23, which connects the consumer ports not connected to the second spool piston 26 to the second main return line 76 and which are thus relieved to the tank. The second collecting channel 84 is configured in such a way that the consumer ports connected to it are throttled by a second throttle 86 and relieved to the return line R via the second return collecting channel 76.

Figure 5:
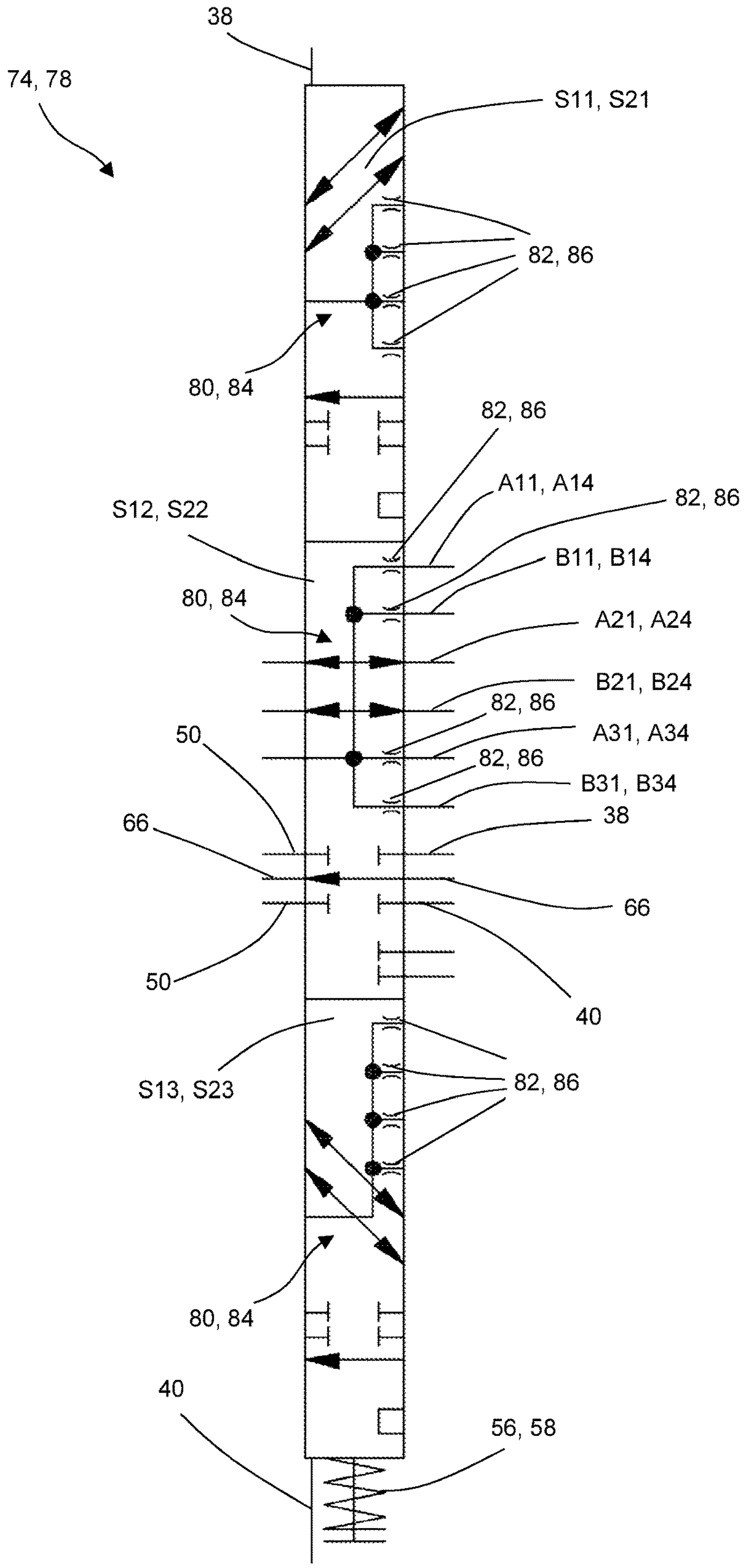
FIG. 5 is a detailed view of an 8/3-spool diverter shown in FIG. 4.

The first throttle 82 and the second throttle 86 can be implemented via a hydraulic resistor for each of the connected consumer ports, as shown in FIG. 5. Alternatively, of course, central throttling can also be implemented for each of the connected consumer ports.

Figure 6:
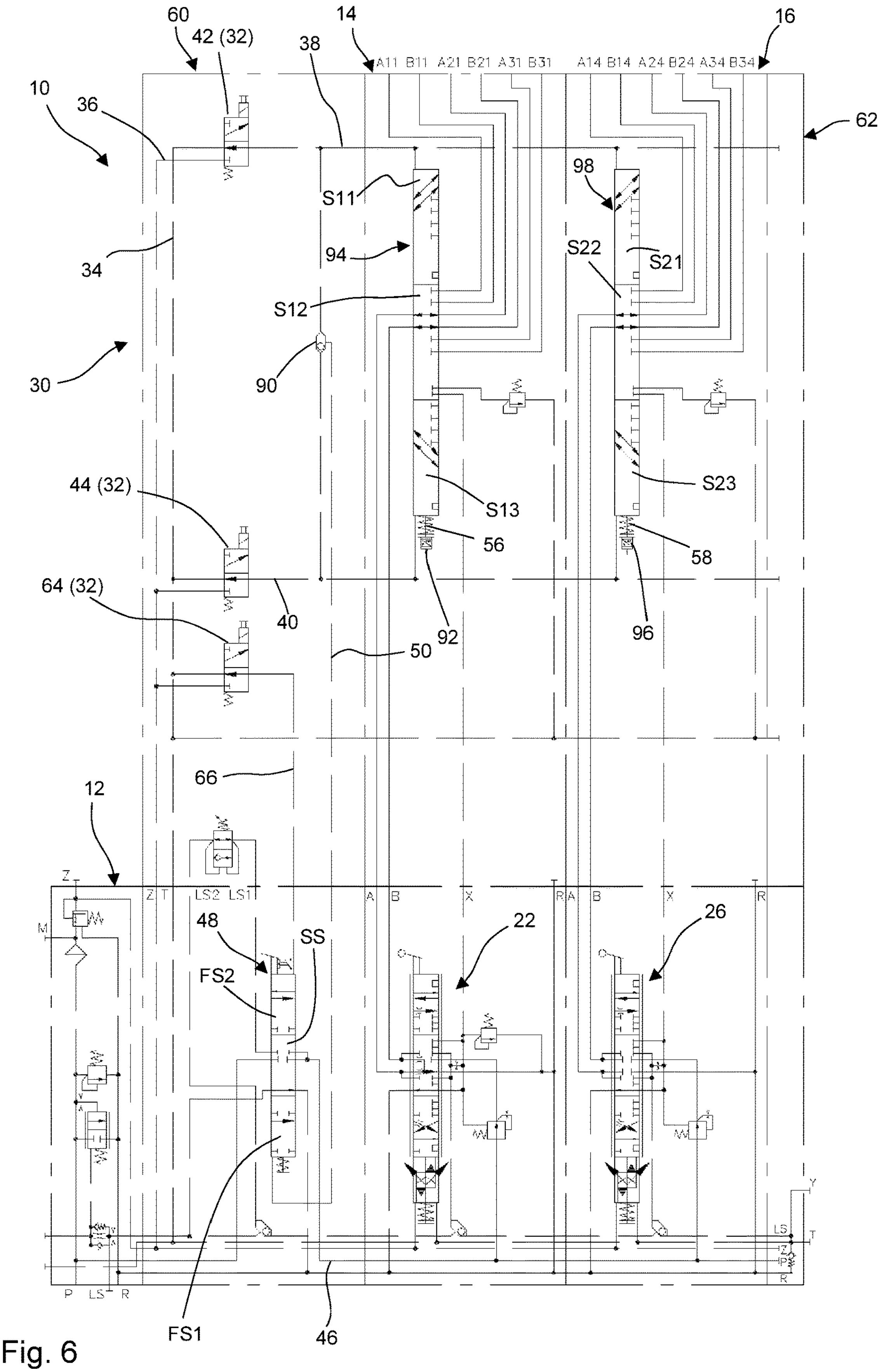
FIG. 6 is a hydraulic circuit diagram of a hydraulic valve assembly according to the invention in accordance with a third embodiment.
Figure 7:
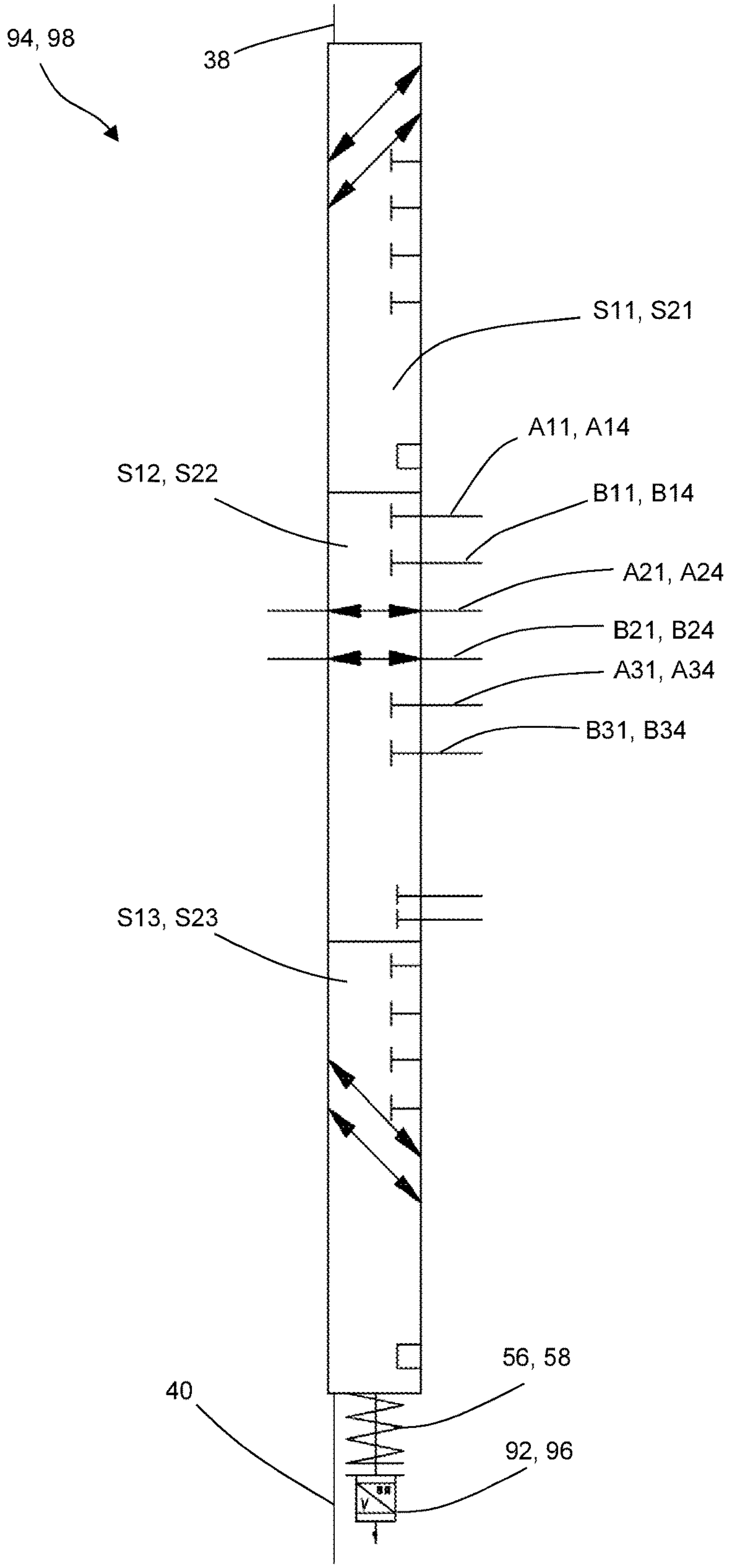
FIG. 7 is a detailed view of an 8/3-spool diverter shown in FIG. 6.

In FIGS. 6 and 7, a third embodiment of a hydraulic valve assembly 10 is shown. This embodiment differs from the hydraulic valve assembly according to the first embodiment in that the pilot pressure is signaled directly to the shut-off valve 48 via the pilot valve device 32 and the first and second pilot branches 38, 40 are not redirected in the end plate 62 but terminate there. Accordingly, the second shut-off valve pilot line 66 is also not redirected in the end plate 62, but is directly connected to the shut-off valve 48 in the intermediate section 60.

In addition, the first spool diverter 94 has a first position sensor 92 and the second spool diverter 98 has a second position sensor 96. The first position sensor 92 and the second position sensor 96 transmit a corresponding position signal of the first spool diverter 94 and the second spool diverter 98 to a (not shown) higher-level controller. Thus, it can be determined whether the first spool diverter 94 and the second spool diverter 98 are each in the same switching position, and a faulty control can be reliably excluded.

The first pilot branch 38 and the second pilot branch 40 are connected to the first shut-off valve pilot line 50 via a selector valve 90. When the pilot valve device 32 is switched to the first switching position to switch the first spool branch 94 and the second spool branch 98 together to the first switching position S11, S21, the first pilot valve 42 is energized. The second pilot valve 44 remains de-energized, so that the second pilot branch 40 is connected to the return line 36. Accordingly, the third pilot valve 64 also remains de-energized, so that the second shut-off valve pilot line 66 is connected to the return line 36. This corresponds to the first switching position of the pilot valve device 32. Consequently, the first pilot branch 38 is connected to the pilot line 34 and the first spool diverter 94 and the second spool diverter 98 are moved together against the first reset device 56 and against the second reset device 58 from the second switching position S12, S22 to the first switching position S11, S12. At the same time, the pilot pressure from the pilot line 34 is signaled via the selector valve 90 and the first shut-off valve pilot line 50 to the shut-off valve 48, which is switched from the blocking position SS to the first release switching position FS1 and releases the pressure line 46. Any residual pressure present in the second shut-off valve pilot line 66 can be relieved directly to the tank T via the return line 36.

When the first spool diverter 94 and the second spool diverter 98 are to be switched together to the third switching position S13, S23, the second pilot valve 44 is energized and the first pilot valve 42 and the third pilot valve 64 remain de-energized. This corresponds to the second switching position of the pilot valve device 32. Consequently, the second pilot branch 40 is connected to the first shut-off valve pilot line 50 via the selector valve 90. The first pilot branch 38 and the second shut-off valve pilot line 66 are connected to the return line 36, so that any residual pressure is relieved directly to the tank T. The shut-off valve 48 is switched to the first release switching position FS1 and the pressure line 46 is released.

To switch the first spool diverter 94 and the second spool diverter 98 together to the second switching position S12, S22, the third pilot valve 64 is energized. The first pilot valve 42 and the second pilot valve 44 remain de-energized. This corresponds to the third switching position of the pilot valve device 32. Thus, the first pilot branch 38 and the second pilot branch 40 are connected to the return line 36. Since there is thus no pilot pressure at the first spool valve branch 94 and the second spool valve branch 98, these are switched to the second switching position S12, S22 via the first reset device 56 and the second reset device 58, respectively. At the same time, the pilot pressure from the pilot line 34 is signaled to the shut-off valve 48 via the third pilot valve 64 and the second shut-off valve pilot line 66. The shut-off valve 48 thus switches to the second release switching position FS2 and releases the pressure line 46.

Figure 8:
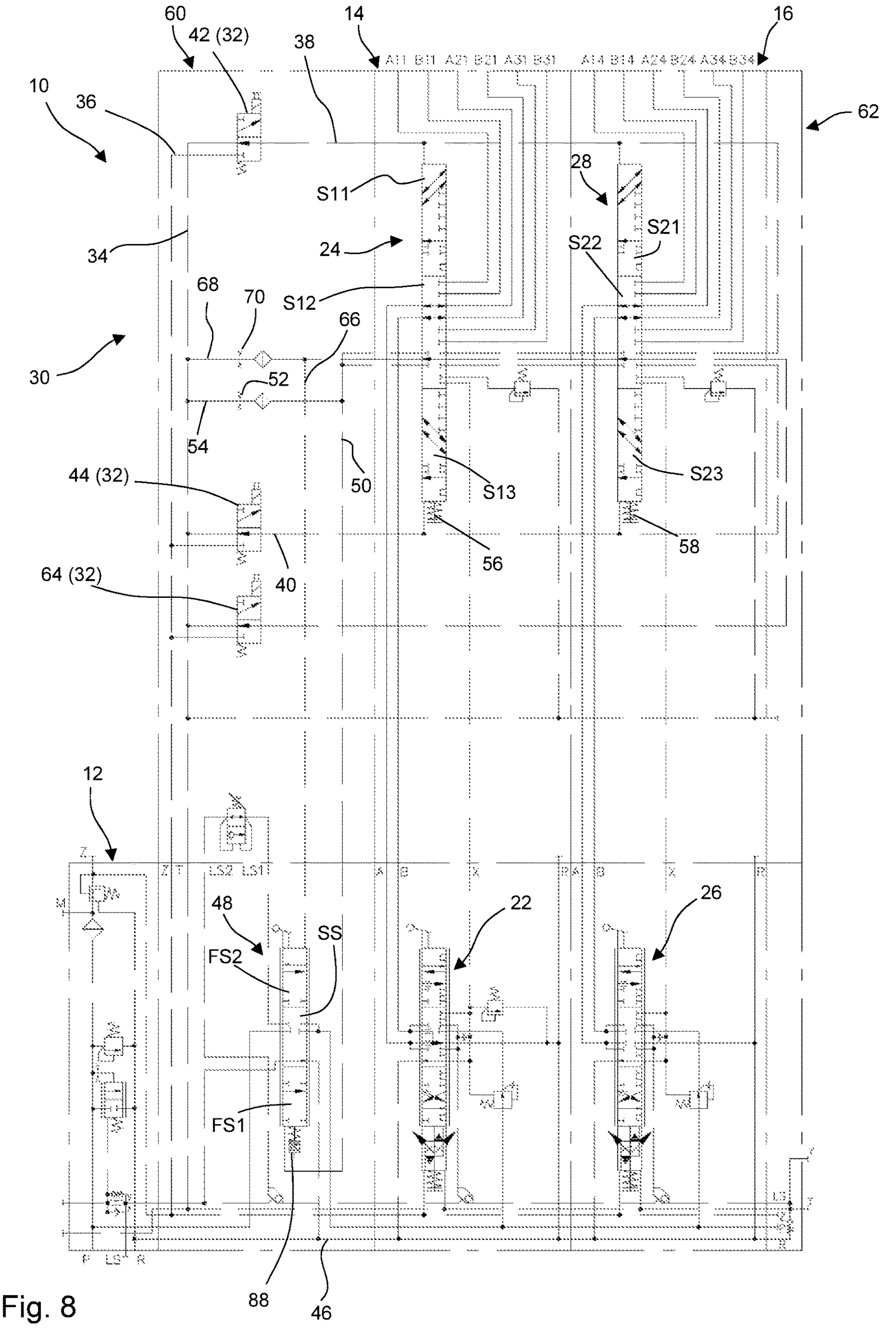
FIG. 8 is a hydraulic circuit diagram of a hydraulic valve assembly according to the invention in accordance with a fourth embodiment.

FIG. 8 shows a hydraulic valve assembly 10 according to a fourth embodiment. The hydraulic valve assembly 10 according to the fourth embodiment differs from the hydraulic valve assembly shown in FIG. 1 in the configuration and actuation of the shut-off valve 48. In this embodiment, the shut-off valve 48 is a proportional valve with three switching positions, wherein the shut-off valve is biased into the blocking position SS via the biasing device. Further, the shut-off valve 48 comprises a proportionally measuring displacement transducer 88.

In this embodiment, the pilot valve device 32 is configured such that the pilot pressure for switching the first spool diverter 24 and the second spool diverter 28 to the respective first spool diverter switching position S11, S21 is different from the pilot pressure for switching the first spool diverter 24 and the second spool diverter 28 to the respective third spool diverter switching position S13, S23. Thus, depending on the spool diverter switching position, a different pilot pressure is applied via the first shut-off valve pilot line 50 to the shut-off valve 48 for switching to the first release switching position FS1. In other words, the stroke of the shut-off valve 48 for switching to the first release switching position FS1 depends on whether the first consumer ports A11, B11, A14 and B14 or the third consumer ports A31, B21, A34 and B34 of the respective valve sections 14, 16 are controlled via the first spool piston 24 and the second spool piston 28. The proportional stroke of the shut-off valve 48 can be determined via the displacement transducer 88, so that it is also possible to distinguish the prevailing spool diverter switching position within the first release switching position FS1.

It is conceivable, for example, that a pressure of 15 bar can be applied via the pilot valve device 32 to the first pilot branch 38 for switching the first spool diverter 24 and the second spool diverter 28 into the respective first spool diverter switching position S11, S21. Accordingly, a pressure of 18 bar, for example, can be applied via the pilot valve device 32 to the second pilot branch 40 for switching the first spool diverter 24 and the second spool diverter 28 into the respective third spool diverter switching position S13, S23. So that the first spool diverter 24 and the second spool diverter 28 switch reliably irrespective of the different pilot pressures, the first reset device 56 and the second reset device 58 are adapted to the correspondingly different pilot pressures. It is possible that the first pilot valve 42 and the second pilot valve 44 are also configured as proportional valves so as to apply the different pilot pressures to the respective pilot branch 38, 40.

In both cases, the shut-off valve 48 switches to the first release switching position FS1, but with a different stroke in each case, which is detected via the displacement transducer 88. The shut-off valve 48 is preferably configured in such a way that the quantity flowing via the shut-off valve 48 is independent of the stroke in the first release switching position FS1, but in both cases corresponds at least to the maximum quantity required to control the correspondingly connected hydraulic consumers.

Figure 9:
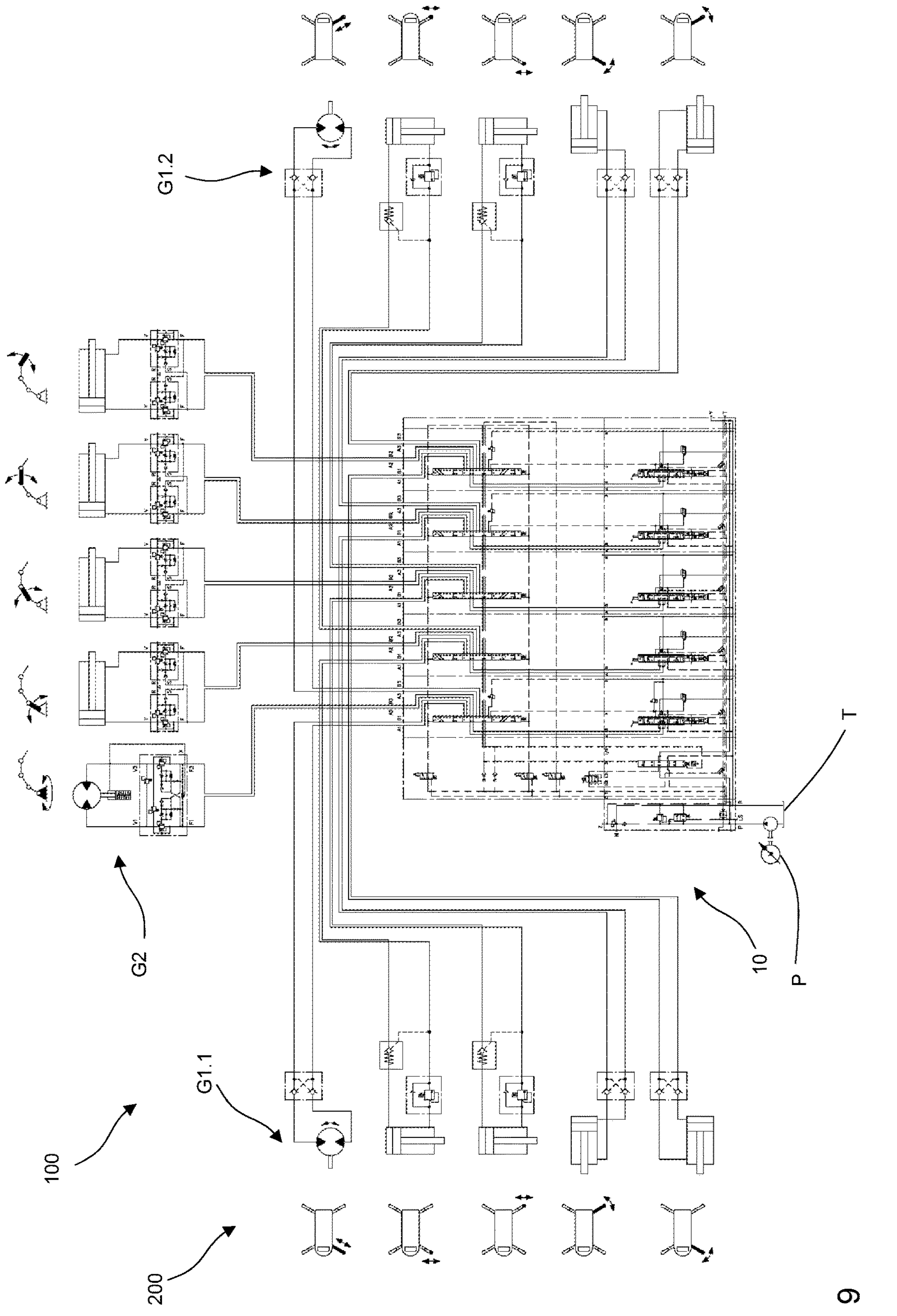
FIG. 9 is an illustration of a commercial vehicle with a mobile hydraulic system comprising a hydraulic valve assembly according to the invention.

In FIG. 9, a commercial vehicle 200 is shown schematically, which has a mobile hydraulic system 100, a mast and supports, for example a vehicle-mounted concrete pump. The mobile hydraulic system 100 comprises a pump P, a tank T, a hydraulic valve assembly 10 described above, and a plurality of hydraulic consumers connected to the hydraulic valve assembly 10 in a known manner. In this exemplary embodiment, the hydraulic valve assembly comprises a total of five valve sections. In this exemplary embodiment, the hydraulic consumers are grouped into three groups. In the first group G1.1, for example, the hydraulic consumers of the left-hand supports are grouped together, in the third group G1.2, for example, the hydraulic consumers of the right-hand supports are grouped together, and in the second group G2, for example, the hydraulic consumers of the mast are grouped together. The first group G1.1 of hydraulic consumers is connected to the first consumer ports of the respective valve section. The second group G2 of hydraulic consumers is connected to the second consumer ports of the respective valve section, and the third group G1.2 of hydraulic consumers is connected to the third consumer ports of the respective valve section.

To control the first group G1.1, the spool diverters of the five valve sections are switched together to the first switching position S11, S21, . . . . The other groups G2 and G1.2 are blocked. Accordingly, the spool diverters of the five valve sections are switched together into the second switching position S12, S22, . . . in order to control the second group G2 of hydraulic consumers. The first group G1.1 and the third group G1.2 are blocked. In order to control the third group G1.2 at hydraulic consumers, the spool diverters of the five valve sections are switched together to the third switching position S13, S23, . . . . The first group G1.1 and the second group G2 are blocked. Based on the resulting position of the shut-off valve 48 in the first release switching position FS1 or in the second release switching position FS2, it can be reliably derived whether the supports (in the first group G1.1 and the third group G1.2) or the mast (in the second group G2) are currently being controlled.

According to the present invention, of course, any number of valve sections may be used, depending on the requirements of the mobile hydraulic system 100. Also, the embodiments may be combined with each other. For example, it is conceivable for a hydraulic valve assembly 10 to have a first spool piston 24 in the first valve section 14 in accordance with the first embodiment and to have a spool piston 74 in the second valve section 16 in accordance with the second embodiment. Finally, it should also be pointed out that the terms used herein, such as "first", "second" or "third", do not specify a specific order, but serve exclusively to separate and distinguish elements and features.

LIST OF REFERENCE SIGNS

- 10 hydraulic valve assembly
- 12 connection section
- 14 first valve section
- 16 second valve section
- 18 third valve section
- 20 fourth valve section
- 22 first spool piston
- 24 first spool diverter
- 26 second spool piston
- 28 second spool diverter
- 30 hydraulic pilot control device
- 32 pilot valve device
- 34 pilot line
- 36 return line
- 38 first pilot branch
- 40 second pilot branch
- 42 first pilot valve
- 44 second pilot valve
- 46 pressure line
- 48 shut-off valve
- 50 first shut-off valve pilot line
- 52 first relief line
- 54 first hydraulic resistor/nozzle
- 56 first reset device
- 58 second reset device
- 60 intermediate section
- 62 end plate
- 64 third pilot valve
- 66 second shut-off valve pilot line
- 68 second relief line
- 70 second hydraulic resistor/nozzle
- 72 first main return line
- 74 first spool diverter
- 76 second main return line
- 78 second spool diverter
- 80 collecting channel of first spool diverter
- 82 first throttle of the first spool diverter
- 84 collecting channel of second spool diverter

86 second throttle of second spool diverter
88 displacement transducer
90 selector valve
92 first position sensor
94 first spool diverter
96 second position sensor
98 second spool diverter
100 mobile hydraulic system
200 commercial vehicle
A11 (first) consumer port of the first valve section
A14 (first) consumer port of the second valve section
A21 (second) consumer port of the first valve section
A24 (second) consumer port of the second valve section
A31 (third) consumer port of the first valve section
A34 (third) consumer port of the second valve section
B11 (first) consumer port of the first valve section
B14 (first) consumer port of the second valve section
B21 (second) consumer port of the first valve section
B24 (second) consumer port of the second valve section
B31 (third) consumer port of the first valve section
B34 (third) consumer port of the second valve section
FS1 first release switching position
FS2 second release switching position
G1.1 first group of hydraulic consumers
G2 second group of hydraulic consumers
G1.2 third group of hydraulic consumers
P pressure connection/pump
R return line
T tank
S11 first spool diverter switching position of first spool diverter
S12 second spool diverter switching position of first spool diverter
S13 third spool diverter switching position of first spool diverter
S21 first spool diverter switching position of second spool diverter
S22 second spool diverter switching position of second spool diverter
S23 third spool diverter switching position of second spool diverter
SS blocking position

The invention claimed is:

1. A hydraulic valve assembly, comprising:
a connection section;
a first valve section; and
a pressure line,
wherein the first valve section can be pressurized by the connection section via the pressure line,
wherein the first valve section comprises a first spool piston, a first spool diverter, at least one first consumer port of the first valve section, and at least one second consumer port of the first valve section,
wherein a first group of hydraulic consumers can be controlled via the at least one first consumer port of the first valve section,
wherein a second group of hydraulic consumers can be controlled via the at least one second consumer port of the first valve section, wherein the first spool diverter can be switched at least into a first spool diverter switching position and a second spool diverter switching position,
so that the first group of hydraulic consumers can be controlled via the first spool piston when the first spool diverter is in the first spool diverter switching position, and
so that the second group of hydraulic consumers can be controlled via the first spool when the first spool diverter is in the second spool diverter switching position, and
wherein a shut-off valve is disposed in the pressure line, and the shut-off valve blocks the pressure line in a blocking position,
wherein the shut-off valve can be switched from the blocking position into a first release switching position and a second release switching position, the pressure line being released in the first release switching position and in the second release switching position,
wherein the shut-off valve switches to the first release switching position when the first spool diverter is in the first spool diverter switching position allowing a pilot pressure to be applied to the shut-off valve, and
wherein the shut-off valve switches to the second release switching position when the first spool diverter is in the second spool diverter switching position allowing a pilot pressure to be applied to the shut-off valve.

2. The hydraulic valve assembly according to claim 1, wherein the shut-off valve is biased to the blocking position.

3. The hydraulic valve assembly according to claim 1, wherein the first valve section comprises a first reset device, wherein the first reset device biases the first spool diverter into the second spool diverter switching position.

4. The hydraulic valve assembly according to claim 1, wherein the shut-off valve is disposed between the connection section and the first spool piston in the pressure line.

5. The hydraulic valve assembly according to claim 4, wherein the hydraulic valve assembly comprises an intermediate section disposed between the connection section and the first valve section, wherein the shut-off valve is disposed in the intermediate section.

6. The hydraulic valve assembly according to claim 1, wherein the hydraulic valve assembly comprises at least one second valve section which can be pressurized by the connection section via the pressure line, the second valve section having a second spool piston, a second spool diverter, at least one first consumer port of the second valve section and at least one second consumer port of the second valve section, the first group of hydraulic consumers can be controlled via the at least one first consumer port of the second valve section, the second group of hydraulic consumers can be controlled via the at least one second consumer port of the second valve section, the second spool diverter can be switched into a first spool diverter switching position and a second spool diverter switching position, so that the first group of hydraulic consumers can be controlled via the second spool piston when the second spool diverter is in the first spool diverter switching position, and
so that the second group of hydraulic consumers can be controlled via the second spool piston when the second spool diverter is in the second spool diverter switching position,
wherein the first spool diverter and the second spool diverter switch together and in parallel into the respective first spool diverter switching position or into the respective second spool diverter switching position,
wherein the second valve section comprises a second reset device, wherein the second reset device biases the second spool diverter into the second spool diverter switching position.

7. The hydraulic valve assembly according to claim 1, wherein the first valve section comprises at least one third consumer port of the first valve section, a third group of hydraulic consumers can be controlled via the at least one third consumer port of the first valve section, the first spool diverter can be switched into a third spool diverter switching position, so that the third group of hydraulic consumers can be controlled via the first spool piston when the first spool diverter is in the third spool diverter switching position.

8. The hydraulic valve assembly according to claim 7, wherein the second valve section has at least one third consumer port of the second valve section, the third group of hydraulic consumers can be controlled via the at least one third consumer port of the second valve section, the second spool diverter can be switched into a third spool diverter switching position, so that the third group of hydraulic consumers can be controlled via the second spool piston when the second spool diverter is in the third spool diverter switching position, wherein the first spool diverter can be switched together and in parallel with the second spool diverter into the respective third spool diverter switching position.

9. The hydraulic valve assembly according to claim 8, wherein the shut-off valve switches to the first release switching position when the first spool diverter and the second spool diverter are in the third spool diverter switching position.

10. The hydraulic valve assembly according to claim 1, wherein the hydraulic valve assembly comprises a hydraulic pilot control device, the hydraulic pilot control device being configured to apply a pilot pressure the first spool diverter and/or the second spool diverter for common and parallel switching into the first spool diverter switching position and/or the third spool diverter switching position, and wherein pilot pressure can be applied to the shut-off valve via the hydraulic pilot control device for switching from the blocking position into the first release switching position or into the second release switching position.

11. The hydraulic valve assembly according to claim 10, wherein the hydraulic pilot control device has at least one first shut-off valve pilot line for switching the shut-off valve from the blocking position to the first release switching position, wherein a pilot pressure is only applied to the at least one first shut-off valve pilot line when the first spool diverter and the second spool diverter are each in the first spool diverter switching position or when the first spool diverter and the second spool diverter are each in the third spool diverter switching position.

12. The hydraulic valve assembly according to claim 11, wherein the hydraulic pilot device comprises a pilot valve device, a pilot line, a return line, a first pilot branch, and a second pilot branch, wherein a pilot pressure in the first pilot branch switches the first spool diverter and the second spool diverter together into the respective first spool diverter switching position, wherein a pilot pressure in the second pilot branch switches the first spool diverter and the second spool diverter together into the respective third spool diverter switching position, wherein the pilot valve device in a first switching position applies pilot pressure to the first pilot branch and connects the second pilot branch to the return line, and wherein the pilot valve device in a second switching position applies pilot pressure to the second pilot branch and connects the first pilot branch to the return line.

13. The hydraulic valve assembly according to claim 12, wherein the at least one first shut-off valve pilot line can be pressurized with pilot pressure via the first pilot branch and/or via the second pilot branch.

14. The hydraulic valve assembly according to claim 11, wherein the at least one first shut-off valve pilot line can be relieved to the tank via a first relief line.

15. The hydraulic valve assembly according to claim 14, wherein the first relief line opens into the return line of the hydraulic pilot device, a first hydraulic resistor is disposed in the first relief line, and the first hydraulic resistor is a nozzle.

16. The hydraulic valve assembly according to claim 12, wherein the hydraulic valve assembly has a second shut-off valve pilot line for switching the shut-off valve from the blocking position to the second release switching position, wherein pilot pressure is applied to the second shut-off valve pilot line in a third switching position of the pilot valve device.

17. The hydraulic valve assembly according to claim 16, wherein the second shut-off valve pilot line can be relieved to the tank via a second relief line, wherein the second relief line opens into the return line of the hydraulic pilot device, wherein a second hydraulic resistor is disposed in the second relief line, wherein the second hydraulic resistor is a nozzle.

18. A mobile hydraulic system comprising a hydraulic valve assembly according to claim 1, wherein the mobile hydraulic system comprises at least the first group of hydraulic consumers and the second group of hydraulic consumers, wherein the first group of hydraulic consumers is connected in particular to the first consumer port of the first valve section and to the first consumer port of the second valve section, and the second group of hydraulic consumers is connected in particular to the second consumer port of the first valve section and to the second consumer port of the second valve section.

19. A commercial vehicle comprising a mobile hydraulic system according to claim 18.

* * * * *